(12) United States Patent
Rowell

(10) Patent No.: US 7,633,185 B2
(45) Date of Patent: Dec. 15, 2009

(54) APPARATUS FOR INTERFACING A THREE PHASE POWER SUPPLY TO A LOAD

(75) Inventor: Shane M. Rowell, Arlington, WA (US)

(73) Assignee: Eaton Corporation, Cleveland, OH (US)

( * ) Notice: Subject to any disclaimer, the term of this patent is extended or adjusted under 35 U.S.C. 154(b) by 581 days.

(21) Appl. No.: 11/557,981

(22) Filed: Nov. 9, 2006

(65) Prior Publication Data

US 2008/0111429 A1     May 15, 2008

(51) Int. Cl.
  *H02B 1/24* (2006.01)
  *H03D 13/00* (2006.01)
(52) U.S. Cl. ............................ 307/127; 324/76.77
(58) Field of Classification Search ............... 307/127; 324/76.77, 76.11, 86, 522, 713
  See application file for complete search history.

(56) References Cited

U.S. PATENT DOCUMENTS

| | | | |
|---|---|---|---|
| 2,724,782 A | 11/1955 | Holloway | |
| 3,825,768 A | 7/1974 | Grygera | |
| 3,976,919 A | 8/1976 | Vandevier et al. | |
| 4,021,704 A | 5/1977 | Norbeck | |
| 4,617,534 A * | 10/1986 | Lill | 331/117 R |
| 4,926,131 A * | 5/1990 | Leydier | 327/126 |
| 5,748,463 A * | 5/1998 | Tsutsui et al. | 363/127 |
| 6,541,954 B1 | 4/2003 | Gluszek | |
| 7,208,955 B2 * | 4/2007 | Zansky et al. | 324/418 |

* cited by examiner

*Primary Examiner*—Albert W Paladini
(74) *Attorney, Agent, or Firm*—Martin J. Morgan

(57) ABSTRACT

An apparatus monitors and controls application of three phases of alternating voltage to a load by detecting the sequence of the three phases. A switch module is operated, in response to the detected sequence, to ensure that the three phases are properly applied to the load, even if the utility lines are improperly connected. The monitoring also senses loss of a phase in which case the switch module disconnects the application of electricity to the load. The apparatus is capable of being used with different loads that operate at different peak to peak levels of alternating voltage.

20 Claims, 3 Drawing Sheets

PULSE DETECT
SUBROUTINE

APPARATUS FOR INTERFACING A THREE PHASE POWER SUPPLY TO A LOAD

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to apparatus for monitoring and ensuring the proper connection of three phases of electric power to a load, and more particularly to apparatus which automatically detects improper connection and alters the connection for proper phase relationship between the supply and the load connections.

2. Description of the Related Art

Long-haul trucks often have a cargo box that is refrigerated in order to transport food and other loads which require refrigeration. When the truck is moving, a refrigeration unit, that is powered by electricity from an alternator driven by an engine, maintains the cargo box interior at the proper temperature. However when the truck is parked, such as at a distribution center or rest area, the refrigeration unit is commonly connected to electrical utility lines at that site in order to conserve fuel and eliminate engine exhaust emissions. That connection is accomplished by a cable that has a plug which engages a receptacle to which the source of electrical power the refrigeration unit has a connection plug to which the electrical utility lines are attached.

Many refrigeration units operate on three-phase electrical power and it is critical that the three prongs of the refrigeration unit plug be properly connected to the three phases (designated A, B and C) of alternating currents in the electrical utility lines. Specifically, phase angle of the phase A voltage must lead to phase angle of the phase B voltage by 120 degrees and the phase angle of the phase B voltage must in turn lead to the phase angle of the phase C voltage by 120 degrees. This provides a phase sequence commonly referred to as ABC. Therefore, the voltage each prong of plug is intended to receive either the A, B or C phase so that the electricity is supplied with the proper phase relationships. If any of the two phases are swapped in the connection of the plug to the electrical utility lines, the phasing is referred to as ACB. In that situation the angle of the phase A voltage lags the phase angle of the phase B voltage by 120 degrees and the phase angle of the phase B voltage lags the phase angle of the phase C voltage by 120 degrees. This results in the electrical voltage being incorrectly applied to the refrigeration unit, causing improper operation and possible damage to the motors and other components. For example, a direction that a three phase motor rotates depends upon the phase sequence.

Therefore, the proper electrical connection requires that the prongs of the refrigeration unit plug and the contacts of the utility receptacle be wired in the same manner or the proper phase relationship will not exist. To prevent improper connection, the plugs and receptacles are designed to mate in only one orientation and there is a defined standard for connecting the phase lines to the terminals of plug and the receptacle. However, it is not uncommon that a receptacle for the electrical utility lines is improperly wired. As a consequence, occasionally a truck's refrigeration equipment is damaged by an improper electrical connection.

To prevent such damage, electrical phase controllers have been used to interface the power cable to the refrigeration unit. These controllers either disconnected the equipment from the electrical connector when an improper phase sequence is found to exist or had set of contactors which reversed the connections so that the proper phase sequence is applied to the refrigeration equipment. The prior electrical phase controllers devices had one contactor that applied the ABC lines of the cable to the ABC input terminals of the refrigeration unit and another contactor that swapped the improperly connected cable lines so that the proper current phases were applied to the ABC input terminals. A phase monitor detected the actual phase sequence and activated the appropriate contactor of the controller.

It is also important to detect the absence of one of the three phases as the equipment is designed to operate correctly when all three phases are present. When one of the phases is not present, larger stresses are placed on the remaining phase and this can result in overheating of motors and other electrical equipment. Apparatus also has been provided to disconnect supply lines from electrical equipment when a missing phase is detected.

A further problem exists when the supply voltage is significantly less than or greater than the nominal specified voltage for the equipment. During such conditions devices, such as motors, do not operate efficiently and can often overheat. Here too monitors have been provided in electrical equipment to disconnect the supply line connections during significant under voltage situations.

Monitoring apparatus for phase sequence, a missing phase, and under/over voltages perform by sensing the voltages on each of the three phases. Therefore, a particular monitoring device heretofore was specifically designed for a particular utility line voltage of the country in which the apparatus was to be used. In the United States for example, the three phases are typically at 220 volts, whereas in other countries the phase voltage may be 400 volts, or more. The frequency of the alternating electricity also is either 50 HZ or 60 Hz depending upon the country. Thus separate monitoring circuits were designed and manufactured based on the country in which that equipment was to be utilized. Providing different models of electrical monitors for operation at different phase voltages and frequencies complicated the manufacture, storage and distribution of the devices.

Therefore it is desirable to provide an electrical supply monitor that has electrical circuitry capable of properly functioning over a wide range of input voltages.

SUMMARY OF THE INVENTION

An apparatus is provided to monitor application of alternating voltage supplied to a load. The alternating voltage from a given source has a nominal peak to peak level that under normal conditions remains substantially constant, however other sources, such as those in different countries, provide alternating voltage at different nominal peak to peak levels.

The apparatus includes a phase monitor that comprises a voltage comparator, a threshold voltage source and a reference voltage source. The voltage comparator has a first input and a second input and produces an output signal indicating a relationship between voltages applied to the first and second inputs. A threshold voltage source derives a threshold voltage from the alternating voltage, wherein the threshold voltage is applied to the first input of the voltage comparator. A reference voltage source derives a reference voltage and a supply voltage from the alternating voltage with the reference voltage being applied to the second input of the voltage comparator and the supply voltage powering the voltage comparator. The reference voltage source comprises a device that has a conductivity that varies inversely to changes of the peak to peak level of the alternating voltage, thereby adapting operation of the apparatus to various peak to peak voltage levels from different sources.

A version of the apparatus monitors application of three phases of voltage to a load, wherein a separate phase monitor is provided for each voltage phase. The output signals from the voltage comparators in each phase monitor are compared to detect a phase sequence among the voltage phases and loss of one or more phases. Control signals are produced indicating the detection of these conditions and the control signals can be used to control devices that take corrective or other responsive actions.

DETAILED DESCRIPTION OF THE INVENTION

Figure 1:
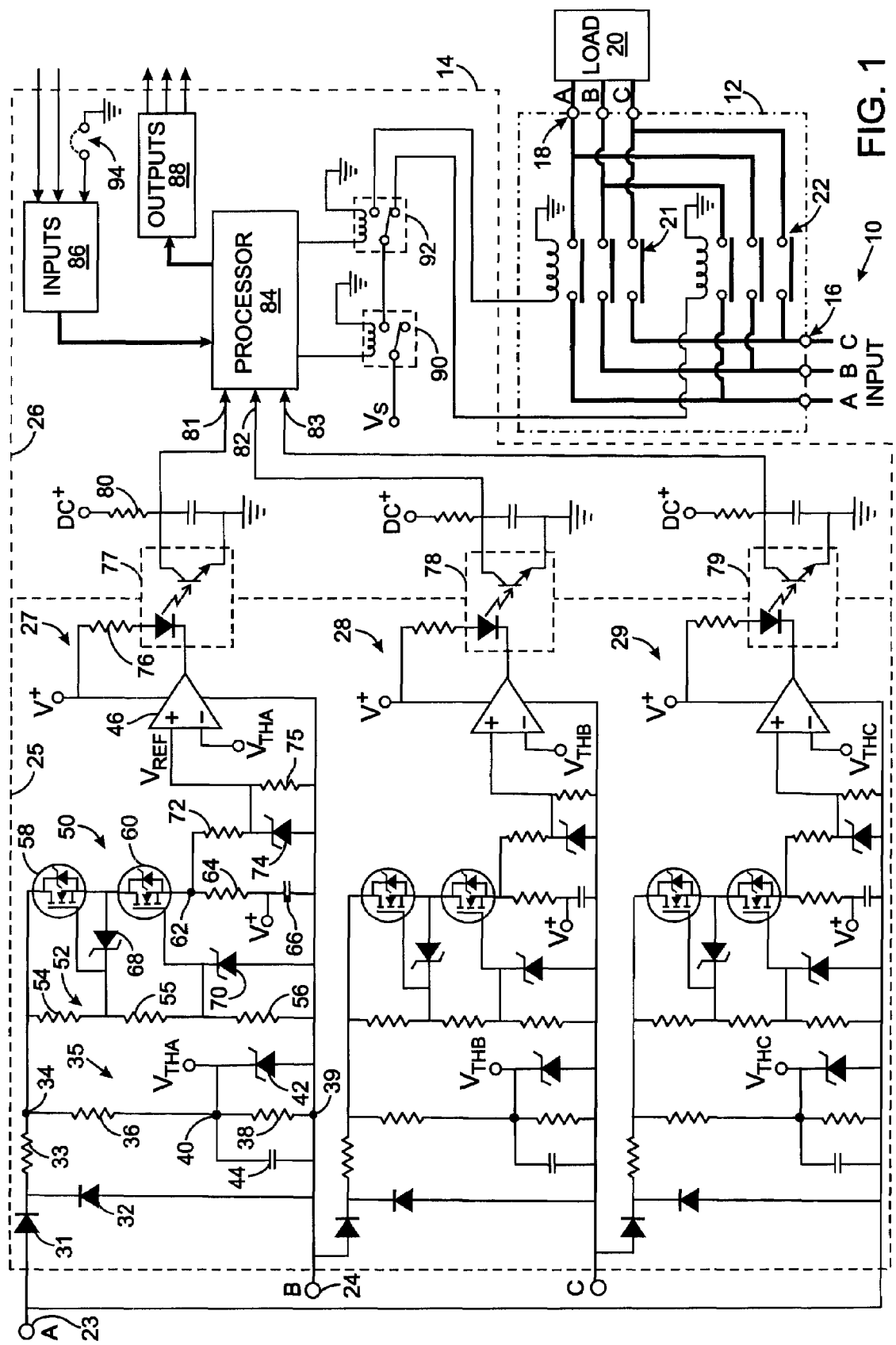
FIG. 1 is a schematic circuit diagram of an electrical power interface according to the present invention.

An electrical power interface 10 comprises a switch module 12 and a phase monitor 14 that operates the switch module. The switch module 12 has three input terminals 16 connected to the three phase lines A, B and C from an electrical power source, such as an electrical utility. For example, when the electrical power interface 10 is included in a refrigeration unit of a truck, the input terminals 16 are part of a plug that mates with an electrical utility receptacle at a location where the truck is parked. The switch module 12 also has three output terminals 18 for the three phase lines A, B and C of a load 20. A first contactor 21 couples the input terminals 16 to the output terminals 18 in a manner that preserves the ABC phase sequence between the respective input and output terminals. A second contactor 22 is connected between the input terminals 16 and the output terminals 18 in a manner that swaps connections of the respective phase lines in the event that the electrical phases are not properly applied to the input terminals 16. Specifically, the A phase input terminal is connected by the second contactor 22 to the B phase output terminal and the B phase input terminal is connected to A phase output terminal. The second contactor 22 connects the C phase input terminal to the C phase output terminal.

The phase monitor 14 determines which of the two contactors 21 or 22 should be closed in order to apply the three-phase utility power properly to the load 20. The phase monitor 14 comprises a high voltage section 25 and a low voltage section 26. The high voltage section 25 has three identical phase detection circuits 27, 28 and 29, one for each of the three electrical phases A, B and C, respectively, applied to input terminals 16. The detection circuit 27 for phase A will be described in detail with the understanding that the other two detection circuits 28 and 29 have identical components, structure and function, with the exception of being connected across different pairs of the input terminals.

The first phase detection circuit 27 has a first diode 31 connected to the A phase input terminal 23 to rectify the alternating voltage and a second diode 32 protects the circuit from reverse voltages that may occur during switching events. The resultant half-wave rectified voltage is coupled by a first resistor 33 to a first node 34. A threshold voltage source 35 comprises a first voltage divider formed by third and fourth resistors 36 and 38 connected in series between the first node 34 and a second node 39 that is directly connected to the phase B input terminal 24. The threshold voltage source 35 produces a lower voltage, designated threshold voltage $V_{THA}$, at a third node 40 from the voltage at the A phase input terminal 23. A first zener diode 42 defines a maximum voltage that may exist at the third node 40 and a first capacitor 44 smoothes the ripple of that voltage. The threshold voltage $V_{THA}$ at third node 40 is applied to the inverting input of a voltage comparator 46. The other two phase detection circuits 27, 28 and 29 have threshold voltage sources that produce threshold voltages $V_{THB}$ and $V_{THC}$ for phases A and B.

The non-inverting input of the voltage comparator 46 is connected to an output of a regulated reference voltage source 50. The reference voltage source has a second voltage divider 52 comprising fifth, sixth and seventh resistors 54, 55 and 56 connected in series between the first and second nodes 34 and 39. The second voltage divider 52 serves to bias first and second field effect transistors 58 and 60, which have source-drain conduction paths connected in series between the first node 34 and a fourth node 62. The fourth node 62 is coupled to the second node 39 by a series connection of an eighth resistor 64 and second capacitor 66, and by another series connection of a ninth resistor 72 and a tenth resistor 75. The first and second field effect transistors 58 and 60 and the ninth resistor and tenth resistor 72 and 75 form a third voltage divider. A supply voltage $V^+$ is produced at the node between the eighth resistor 64 and second capacitor 66 and provides power for the voltage comparator 46 and other components of the first phase detection circuit 27.

The gate electrode of the first field effect transistor 58 is connected to a node between the fifth and sixth resistors 54 and 55 and a second zener diode 68 limits the bias voltage at that gate electrode. The gate electrode of the second field effect transistor 60 is connected to a node between the sixth and seventh resistors 55 and 56 and is coupled by a third zener diode 70 to the second node 39 controls the bias voltage at the gate electrode of transistor 60. The two transistors 58 and 60 are biased so that the power dissipation and voltage drop are divided substantially equally across them. The third zener diode 70 limits the maximum voltage at the gate electrode of the second field effect transistor 60 wherein the voltage at the fourth node 62 is a few volts less than that gate voltage. The fourth node 62, at the source terminal of the second field effect transistor 60, is coupled by the ninth resistor 72 to the non-inverting input of the voltage comparator 46. The non-inverting input also is connected to the second node 39 at the phase B terminal by a fourth zener diode 74 and a tenth resistor 75. The circuit formed by the ninth and tenth resistors 72 and 75 and the zener diode 74 define a reference voltage $V_{REF}$ that is applied to the non-inverting input of the voltage comparator 46.

The first and second field effect transistors 58 and 60 in the regulated reference voltage source 50 form a voltage reducing circuit that provides a supply voltage $V^+$ to the voltage comparator 46 and drive current to other components. The transistors 58 and 60 turn on relatively early during each positive half cycle of the phase A voltage (e.g. when the phase voltage is about 15 volts). At that time, the full supply voltage $V^+$ is furnished to power the voltage comparator 46 and the proper reference voltage $V_{REF}$ is applied to its non-inverting input. This results in reference voltage $V_{REF}$ having a substantially constant level for a substantial portion of the positive half-cycle of the alternating phase voltage. As the phase A voltage increases, the conductivity of the first and second field effect transistors 58 and 60 decreases, resulting in a greater voltage drop across them. That conductivity decrease changes the characteristics of the third voltage divider and thereby maintains the supply voltage $V^+$ at the proper level for powering the voltage comparator 46. This automatic conductivity adjustment enables the same phase detection circuit 27 to be used in equipment designed to operate at a peak to peak phase voltage ranging from less than 100 to 600 volts, for example. The conductivity of the first and second field effect transistors 58 and 60 reduces inversely to the peak phase voltage to maintain the supply voltage $V^+$ and the reference voltage $V_{REF}$ at the same desired levels.

During the initial portion of the positive half cycle, the threshold voltage $V_{THA}$ produced by the threshold voltage source 35 is less than the reference voltage $V_{REF}$. This results in the voltage comparator 46 having a high level output that is applied to opto-isolator 77 which thereby is turned off. In that off state, a high impedance exists across the output of the opto-isolator 77 causing a high level to be applied via a twelfth resistor 80 to a first input 81 of a processor 84.

When the phase A voltage during the positive half cycle reaches a predefined level (e.g. 165 volts), the threshold voltage $V_{THA}$ at the third node 40 becomes greater than the reference voltage $V_{REF}$. Now the inverting input of the voltage comparator 46 has a greater voltage than the non-inverting input and the output of the voltage comparator 46 goes low. The low output sinks current through a current limiting eleventh resistor 76 and the input of an opto-isolator 77, turning on that latter device. In the on state, the output of opto-isolator 77 pulls the first input 81 of a processor 84 to ground, a low logic level. That low logic level at the first input 81 continues until the phase a voltage decreases below the predefined level (e.g. 165 volts) at which time the threshold voltage $V_{THA}$ again becomes less than the reference voltage $V_{REF}$. Thus once during the positive half of each cycle of the A phase voltage, a low level pulse is applied to the first input 81 of the processor 84. The other detection circuits 28 and 29 for phases B and C produce similar pulses that are applied to second and third inputs 82 and 83 of the processor 84. The low level phase pulses are applied to the three inputs 81-83 at different points in time, thereby enabling the processor 84 to determine the phase sequence.

The processor 84 is part of the low voltage section 26 of the electrical power interface 10 and is a commercially available microcomputer that has digital inputs and an internal memory for storing a software control program and data. In addition to the three inputs 81-83 connected to the phase detection circuits 27, 28 and 29, the processor has input circuits 86 and output circuits 88 connected to external control devices and indicators. One of the inputs 86 is used to configure the electrical power interface 10 to control three-phase or single phase power. Specifically that input is connected to ground by a jumper 94 to designate single-phase operation, while the lack of a jumper designates three-phase operation. As will be described, the processor responds to this designation during execution of a software program that monitors and controls application of the electricity from the utility lines to the load 20. The output circuits 88 produce signals to inform external components about operation of the electrical power interface 10.

The processor 84 has other outputs that control a pair of relays 90 and 92 which activate the first and second contactors 21 and 22. Specifically the first relay 90 controls whether a supply voltage designated Vs is applied to the common terminal of the second relay 92. The second relay is a single-pole, double-throw switch having outputs that are connected to the coils of the first and second contactors 21 and 22. The state of the second relay 92 determines which of those contactors is activated when the first relay 90 closes.

Figure 2A:
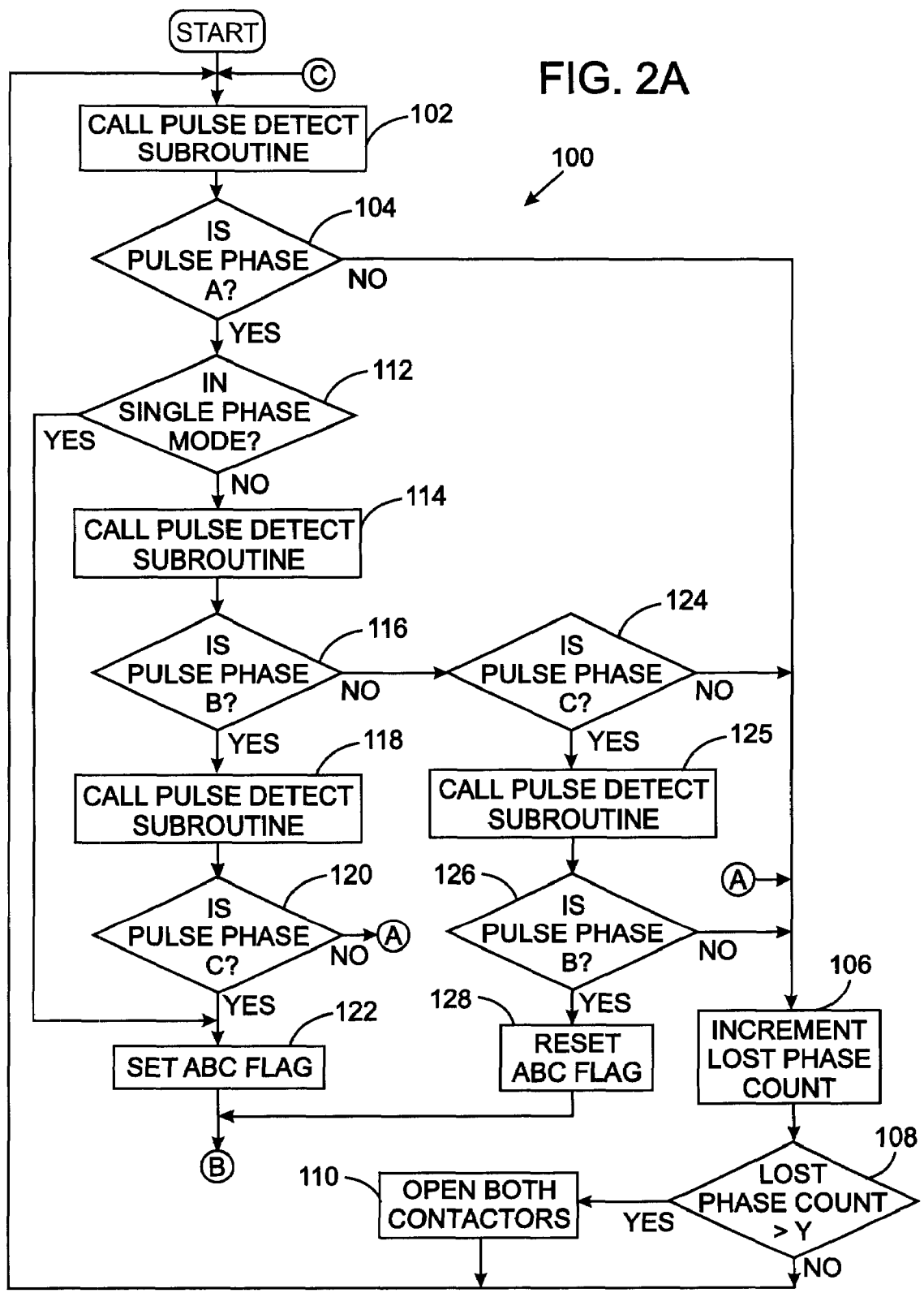
FIGS. 2A and B form a flowchart of the main software program implemented by a processor when the electrical power interface is connected to a three-phase source of electricity.

With reference to FIG. 2A, the processor 84 executes a control program 100 that governs the operation of the electrical power interface 10. Execution of the control program commences at step 102 where a pulse detect subroutine is called to wait for a phase pulse on one of the processor inputs 81-83.

Figure 3:
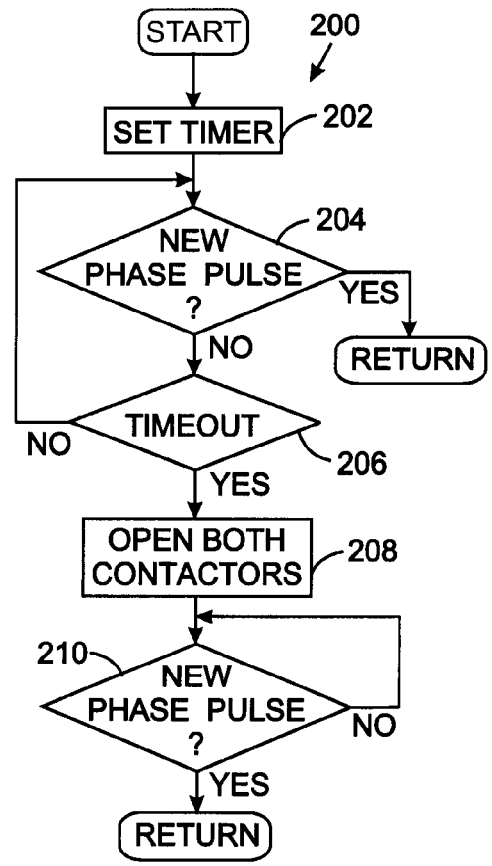
FIG. 3 is a flowchart of a subroutine called by the main software program.

The Pulse Detect subroutine 200 is depicted in FIG. 3 and commences at step 202 where a software timer is set that defines the period of time (e.g. at least one period of the alternating phase voltage) that the program waits for another phase pulse. Then, at step 204 the processor 84 checks its three inputs 81-83 for a new phase pulse as indicated by a high to low level signal transition. When a new phase pulse is found, the subroutine 200 returns to the point in the main program at which the subroutine was called. Otherwise the program branches to step 206 where the timer is checked and if it has not timed out the process loops back to step 204. When the timer elapses because a long period of time (e.g. four seconds) transpired without any phase pulse occurring, the execution advances to step 208 at which both contactors are opened by the processor 84 deactivating the first relay 90 in FIG. 1. The timing out of the timer occurs only when none of the phases of the supply power is active, that is a voltage peak does not occur on any phase line. The timer interval is relatively long to allow brief power outages to occur without triggering disconnection of the load 20 from the utility lines. After opening the contactors, the subroutine enters step 210 at which it waits until a phase pulse occurs at which time the Pulse Detect subroutine 200 returns to the main program 100.

Referring again to FIG. 2A, assume that a phase pulse occurred at step 102 causing the program to advance to step 104. At this juncture, the processor 84 determines if the low level pulse is occurring on the phase A input 81. At power-up of the monitor the first phase pulse may not be on phase A and thus the program execution branches to step 106 where a LOST PHASE count is incremented. If that count does not exceed a predefined threshold value Y, the program execution returns to step 102 to wait for another phase pulse. Looping through these steps continues until a phase A pulse is found. During normal operation a phase A pulse should occur before the LOST PHASE count reaches the threshold value Y.

Upon receiving the phase A pulse at step 104, the program execution advances to step 112 where the input connected to the jumper 94 is checked to determine if the apparatus is in single-phase or three-phase operation. In three-phase operation, the execution branches to step 114 at which the Pulse Detect subroutine 200 is called again await another phase pulse. Upon receiving the next phase pulse, the processor 84 makes a determination at step 116 whether that pulse was received on the input 82 for phase B. If that is the case, the program execution branches to step 118 where the Pulse Detect subroutine 200 is called yet again.

At this time since the phase A pulse has been received followed by a phase B pulse, the next pulse normally should occur on the third input 83 indicating a phase C pulse. That determination is made at step 120. However, if that last phase pulse is not from phase C, the phase C voltage has been lost and a supply malfunction exists. In this event, the program execution jumps to step 106 at which the LOST PHASE count is incremented and then checked against the threshold value Y. Action is not taken the first time that voltage loss in a phase is detected as that may be an anomaly or result from a temporary sensing malfunction. Therefore, a lost phase must occur a number of consecutive times Y before responsive action is taken. Until then the program execution returns from step 108 to step 102. When the LOST PHASE count exceeds the threshold value Y, both the first and second contactors 21 and 22 are opened at step 110 before returning to step 102. To open the first and second contactors, the processor 84 de-energizes the first relay 90 cutting off drive current to the coils of those contactors.

Thereafter, voltage remains lost on a phase, the program execution continues to loop through the aforementioned steps while the first and second contactors 21 and 22 remain open. When voltage restored to all three phases, the first relay 90 will close again, thereby reactivating the previously closed contactor 21 or 22.

However during normal operation, finding that a phase C pulse occurred at step 120 indicates that the proper phase sequence ABC exists for the utility connection. Therefore, at step 122 a flag designated ABC is set by the processor 84 to indicate that an ABC phase sequence connection was found.

Alternatively, if step 116 determined that the phase pulse which followed the phase A pulse was not on input 82 for phase terminal B, the program execution branches to step 124. If the phase lines connected to the input terminals 16 are swapped, i.e. misconnected in phase sequence ACB, the phase pulse that follows a phase A pulse should be at the processor input 83 for phase C. Therefore, the processor 84 now determines whether the most recent phase pulse was for phase C. If not, one or more phase voltages has been lost and the program execution branches to step 106 to increment the LOST PHASE count and if appropriate open the contactors 21 and 22, as described previously.

However, assuming that the most recent phase pulse was received at the processor input 83 for phase C, the program branches from step 124 to step 125 to await the next phase pulse. When that occurs a check is made at step 126 whether it is a phase B pulse to verify phase sequence ACB. If not, an error condition exists and the program execution jumps to step 106. However as is typically the case at step 126, a phase B pulse will be found to have occurred causing advancement to step 128 where the ABC flag is reset to indicate the phase sequence ACB.

Figure 2B:
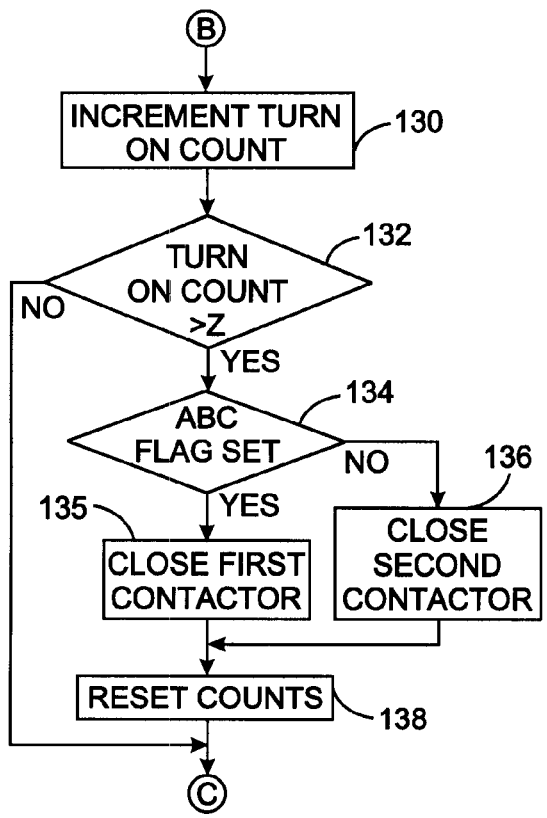

After the program either sets or resets the ABC flag at step 122 or 128, the program goes to step 130 depicted on FIG. 2B. When a legitimate phase sequence (ABC or ACB) is first found to have occurred, the electrical power interface 10 does not immediately close the appropriate first or second contactor 21 or 22. Instead that phase sequence must occur for a given number Z of consecutive voltage cycles. Therefore at step 130, a TURN ON count is incremented and then checked at step 132 to see if that count indicates the occurrence of Z consecutive voltage cycles of the same phase sequence. If not, the program execution returns to step 102 without changing the states of the contractors 21 and 22. This provides a delay in activating the contractors and improperly energizing the load 20 in response to a spurious event.

When the predefined number Z of consecutive voltage cycles of the same phase sequence have occurred, the program branches to step 134 at which the ABC flag is checked to determine which phase sequence exists. When the phase sequence ABC occurred, the first contactor 21 is closed at step 135 by activating the first relay 90 and the second relay 92 in FIG. 1, which applies the supply voltage Vs to the coils of the first contactor. This provides a direct connection of the ABC input terminals to the ABC connection of the load 20. Otherwise when the ACB phase sequence occurs, the second contactor 21 is closed at step 136 by activating the first relay 90 and not activating the second relay 92. This swaps the connection of the ABC input terminals to the ABC connectors of the load 20 in a manner that properly applies the phase voltages to the load. The program execution then returns to step 102 on FIG. 2A to repeat the monitoring process.

The same circuitry of the electrical power interface 10 shown in FIG. 1 also can be employed control the application of single-phase alternating current to a load. In this case only phase A and B input terminals 16 are connected to lines of the utility company. Because input terminal C is unconnected and does not have current flowing thereto, only the first phase detection circuit 27 produces legitimate pulses that are applied to input 81 of the processor 84 and pulses ordinarily do not appear on inputs 82 and 83. However, this is not entirely correct for the entire range of voltages that could be applied at the input terminals 16 depending upon the nominal voltage of the utility company to which the apparatus is connected. When the phase voltage is at least twice the level that produces a threshold voltage which triggers the voltage comparators, phase pulses will be applied by all three detection circuits 27, 28 and 29 to the processor 84. Specifically, with input terminal C unconnected, the second and third detection circuits 28 and 29 are in effect connected in series between the phase A and B terminals. Therefore, the phase A voltage is divided equally across the second and third detection circuits 28 and 29 with each one occasionally receiving a voltage that produces an active threshold voltage, $V_{THA}$ or $V_{THB}$, respectively. This simultaneously triggers the voltage comparators in those circuits to turn on the associated opto-isolator 78 or 79. Therefore the control program does not check the inputs 82 and 83 at which phase B and C pulses occur.

Single phase operation is indicated by the presence of a jumper 94 at a specific one of the input circuits 86 connected to the processor 84. The jumper shorts that input circuit to ground which is detected at step 112 of the control program in FIG. 2A and causes the program to bypass checking for phase B and C pulses on inputs 82 and 83. Now in single-phase operation, the program execution branches from step 112 directly to step 122 at which the ABC flag is set before advancing to step 130 in FIG. 2B. Therefore steps 114 through 120 and steps 124 through 128 are never executed in this mode of operation.

In both single and three phase operating modes the processor 84 may measure the duration of each phase pulse as an indicator of an under or over voltage condition. Specifically, the phase pulse duration indicates how long the respective phase voltage is above the level that defines the voltage threshold $V_{THA}$, $V_{THA}$, or $V_{THA}$ which varies with the peak to peak voltage of the phase. When the phase pulse duration is less than a first given value for a predefined number of cycles, the processor 84 determines that an under voltage condition exists. Similarly when the phase pulse duration is greater than a second given value for a predefined number of cycles, the processor 84 determines that an over voltage condition exists. The appropriate action defined in the control program is taken in response to these conditions. That action can be activating an indicator connected to an output circuit 88 to alert supervisory personnel or open the contactors 21 and 22 to shut down the load 20.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

The invention claimed is:

1. An apparatus adapted for use with different loads to monitor application of alternating voltage supplied to a given load, wherein the different loads operate at a different peak to peak voltage, said apparatus comprising:
   a voltage comparator having a first input, second input and an output at which a signal is produced indicating a relationship between voltages applied to the first and second inputs;
   a threshold voltage source that derives a threshold voltage from the alternating voltage, wherein the threshold voltage is applied to the first input of the voltage comparator; and
   a reference voltage source that derives a reference voltage and a supply voltage from the alternating voltage with the reference voltage being applied to the second input of the voltage comparator and the supply voltage powering the voltage comparator, and comprising a device having a conductivity that varies inversely to differences of the peak to peak voltage.

2. The apparatus as recited in claim 1 wherein the reference voltage has a constant level for a substantial portion of at least one half-cycle of the alternating voltage.

3. The apparatus as recited in claim 1 wherein the device comprises a transistor having an electrode to which a voltage is applied that controls conductivity of the transistor.

4. The apparatus as recited in claim 3 wherein the reference voltage source further comprises a voltage divider connected to the electrode for varying the conductivity of the transistor.

5. The apparatus as recited in claim 1 wherein the device comprises:
   a first transistor and a second transistor having conduction paths connected in series and each having an electrode to which a voltage is applied that controls conductivity of the respective transistor; and
   a voltage divider having one node connected to the electrode of the first transistor and a second node connected to the electrode of the second transistor for varying the conductivity of both transistors so that a voltage drop across the first transistor substantially equals a voltage drop across the second transistor.

6. The apparatus as recited in claim 1 further comprising a switch module that controls the application of alternating voltage to the given load, wherein the switch module terminates the application of the alternating voltage in response to the signal produced at the output of the voltage comparator.

7. An apparatus adapted for use with different loads to monitor application of alternating voltage supplied to a given load, wherein the different loads operate at a different peak to peak voltage, said apparatus comprising:
   a voltage comparator having a first input, second input and an output at which a signal is produced indicating a relationship between voltages applied to the first and second inputs;
   a rectifier which converts the alternating voltage into a DC voltage across first and second nodes;
   a threshold voltage source comprising a first voltage divider that is connected between first and second nodes and that has a third node at which a threshold voltage is produced, wherein the third node is connected to the first input of the voltage comparator; and
   a reference voltage source comprising a second voltage divider connected between first and second nodes, the reference voltage source including a first transistor and a second transistor with conduction paths connected in series between the first node and a fourth node, the first transistor having a control electrode connected to the second voltage divider and the second transistor having another control electrode connected to the second voltage divider, wherein conductivities of the first and second transistors vary inversely to differences of the peak to peak voltage thereby adapting operation of the apparatus to the different loads, wherein the fourth node is coupled to the second input of the voltage comparator.

8. The apparatus as recited in claim 7 wherein the first voltage divider comprises a pair of resistors connected in series with the third node there between.

9. The apparatus as recited in claim 7 further comprising a zener diode connected between the second and third nodes.

10. The apparatus as recited in claim 7 wherein the reference voltage source further comprises a circuit connected to the fourth node and producing a supply voltage that powers the voltage comparator.

11. The apparatus as recited in claim 7 wherein the reference voltage source further comprises a pair of resistors connected in series between the second and fourth nodes with another node between the pair of resistors and connected to the second input of the voltage comparator.

12. The apparatus as recited in claim 7 further comprising a zener diode connected between the second node and the second input of the voltage comparator.

13. An apparatus adapted for use with different loads to monitor and control application of three phases of alternating voltage supplied to a given load, wherein the different loads operate at a different peak to peak voltage, said apparatus comprising:
   three phase detection circuits, each connected to a different one of the three phases and comprising:
   a) a voltage comparator having a first input, second input and an output at which a signal is produced indicating a relationship between voltages applied to the first and second inputs,
   b) a threshold voltage source that that derives a threshold voltage from the alternating voltage, wherein the threshold voltage is applied to the first input of the voltage comparator, and
   c) a reference voltage source that derives a reference voltage and a supply voltage from the alternating voltage with the reference voltage being applied to the second input of the voltage comparator and the supply voltage powering the voltage comparator, and comprising a device having a conductivity that varies inversely to differences of the peak to peak voltage; and
   a circuit that examines the signal produced at the output of the voltage comparator of each phase detection circuit and in response thereto controls the application of the three phases of alternating voltage to the given load.

14. The apparatus as recited in claim 13 wherein the reference voltage for each phase has a constant level for a substantial portion of at least one half-cycle of the alternating voltage.

15. The apparatus as recited in claim 13 wherein each device comprises a transistor having an electrode to which a voltage is applied that controls conductivity of the transistor.

16. The apparatus as recited in claim 15 wherein the reference voltage source further comprises a voltage divider connected to the electrode for varying the conductivity of the transistor.

17. The apparatus as recited in claim 13 wherein the device in each reference voltage source comprises:

a first transistor and a second transistor having conduction paths connected in series and each having an electrode at which a voltage level controls conductivity of the respective transistor; and a voltage divider having one node connected to the electrode of the first transistor and another node connected to the electrode of the second transistor for varying the conductivity of both transistors so that a voltage drop across the first transistor substantially equals a voltage drop across the second transistor.

18. The apparatus as recited in claim 13 wherein the circuit comprises a switch module that controls the application of alternating voltage to the given load, wherein the switch module terminates application of the alternating voltage in response to signals produced at the output of the voltage comparator of each three phase detection circuit.

19. The apparatus as recited in claim 13 wherein circuit detects when one of the three phases of alternating voltage does not exist and in response thereto terminates application of alternating voltage to the given load.

20. The apparatus as recited in claim 13 wherein circuit comprises:

a switch module having input terminals to receive the three phases of alternating voltage are applied, output terminals for connection to the given load, and a contactor assembly connecting the input terminals to the output terminals; and wherein the circuit determines, from signals produced at the output of the voltage comparator in each phase detection circuit, a phase sequence of the three phases of alternating voltage applied to the input terminals and controls the switch module to alter connection of the input terminals to the output terminals so the a proper phase sequence for the given load is applied to the output terminals.

* * * * *